United States Patent [19]
Norwich

[11] 3,989,899
[45] Nov. 2, 1976

[54] TELEPHONE SCHEDULING SYSTEM

[76] Inventor: Daniel Norwich, 350 N. Palm, Beverly Hills, Calif. 90210

[22] Filed: Apr. 8, 1975

[21] Appl. No.: 566,643

[52] U.S. Cl. .............................................. 179/2 DP
[51] Int. Cl.² ...................................... H04M 11/00
[58] Field of Search .................................. 179/2 DP

[56] References Cited
UNITED STATES PATENTS

| | | | |
|---|---|---|---|
| 3,407,269 | 10/1968 | Brzoska | 179/5 R |
| 3,899,645 | 8/1975 | Brafman | 179/2 DP |

*Primary Examiner*—George G. Stellar
*Attorney, Agent, or Firm*—Nilsson, Robbins, Dalgarn & Berliner

[57] ABSTRACT

A system is disclosed for use in cooperation with a telephone network to schedule and control telephonic contacts, as from a plurality of calling stations to a number of parties at individual remote stations. Storage means are provided for registering code words (associated with stations that are to be called) along with representations of message information to be conveyed. For example, code words may store representations of: a number for a station to be called, the name of a party to be contacted at the station, a status code and so on.

In the operation of the system, a control unit actuates an automatic dialing unit with a number from storage. Subsequently, the system senses the possible results of dialing a number, i.e. as a busy signal, no answer or a station contact. In the event of a busy signal or no answer, a code word (from storage) may be appropriately modified then stored for use in a subsequent attempt. Upon the occurrence of a contact, connection is made to an operator station and a display unit is actuated to cue the operator with the desired message. The system also incorporates input means for use by the operator to enter information in the code word indicating the results of a call.

8 Claims, 4 Drawing Figures

TELEPHONE SCHEDULING SYSTEM

BACKGROUND AND SUMMARY OF THE INVENTION

Economies attendant the use of the telephone, as well as the effectiveness of direct oral communication, have resulted in ever-increasing volumes of telephone traffic. However, as a related consideration, persons who use the telephone extensively normally spend a considerable amount of time unsuccessfully trying to establish telephonic contact, their efforts frequently failing as a result of "busy" or "no answer" situations. The present invention is directed to the recognition of the need for a system to effectively accomplish telephonic contacts, and further, to provide such a system in cooperation with structure for effectively scheduling and processing telephonic contacts.

In general, the system of the present invention should be recognized as having widespread application to solve a variety of telephonic scheduling problems. However, a specific form of system will serve to exemplify the structure and illustrate a typical operating application therefor. In that regard, as an illustrative application for the system, consider an operation in which a number of telephone people work through a substantial list of parties to be contacted, pursuing an oral interchange with each party. Of course, such operations are rather common and might involve such specific objectives as: debt collection, telephone solicitation, information surveys and so on.

Recognizing that several variables are involved, it is not uncommon for persons involved in such telephone work to spend in excess of one-half their time attempting to establish telephone contact with desired parties. Consequently, a substantial fragment of the cost attendant a telephone operation as considered above relates to the burdensome and often unsuccessful effort of establishing contact with desired parties. Accordingly, a considerable need exists for an improved system to reduce the time and effort expended by a person to establish telephonic contact. A further need relates to effectively processing the information resulting from the calls and attempted calls of such efforts.

In general, the present invention may be embodied to effectively schedule and expedite telephone calls, as for one or more telephone workers. Each such worker, i.e. operator, is accommodated at a calling or operating station by a telephone instrument, a display apparatus and an input structure. The system incorporates apparatus for storing: the telephone numbers of stations to be contacted, messages to be communicated, and status codes for the station to be contacted, along with other alternative information in the form of identifications and so on. The system processes such information, seeking to contact each station to be called, and upon each contact, the system alerts a specific operator with a cue for the substance of a message to be communicated. Consequently, the operator is able to concentrate on effective communication. The system may also incorporate means for registering indications of the results of telephonic contacts and attempts to contact.

BRIEF DESCRIPTION OF THE DRAWINGS

In the drawings, which constitute a part of this specification, an exemplary embodiment demonstrating the various objectives and features hereof is set forth as follows.

DESCRIPTION OF ILLUSTRATIVE EMBODIMENT

As indicated above, a detailed illustrative embodiment of the invention is disclosed herein. However, embodiments may be constructed in accordance with various forms, some of which may be rather different from the disclosed illustrative embodiment. Consequently, the specific structural and functional details disclosed herein are merely representative, yet in that regard are deemed to provide the best embodiment for purposes of disclosure and to provide a basis for the claims herein which define the scope of the present invention.

Figure 1:
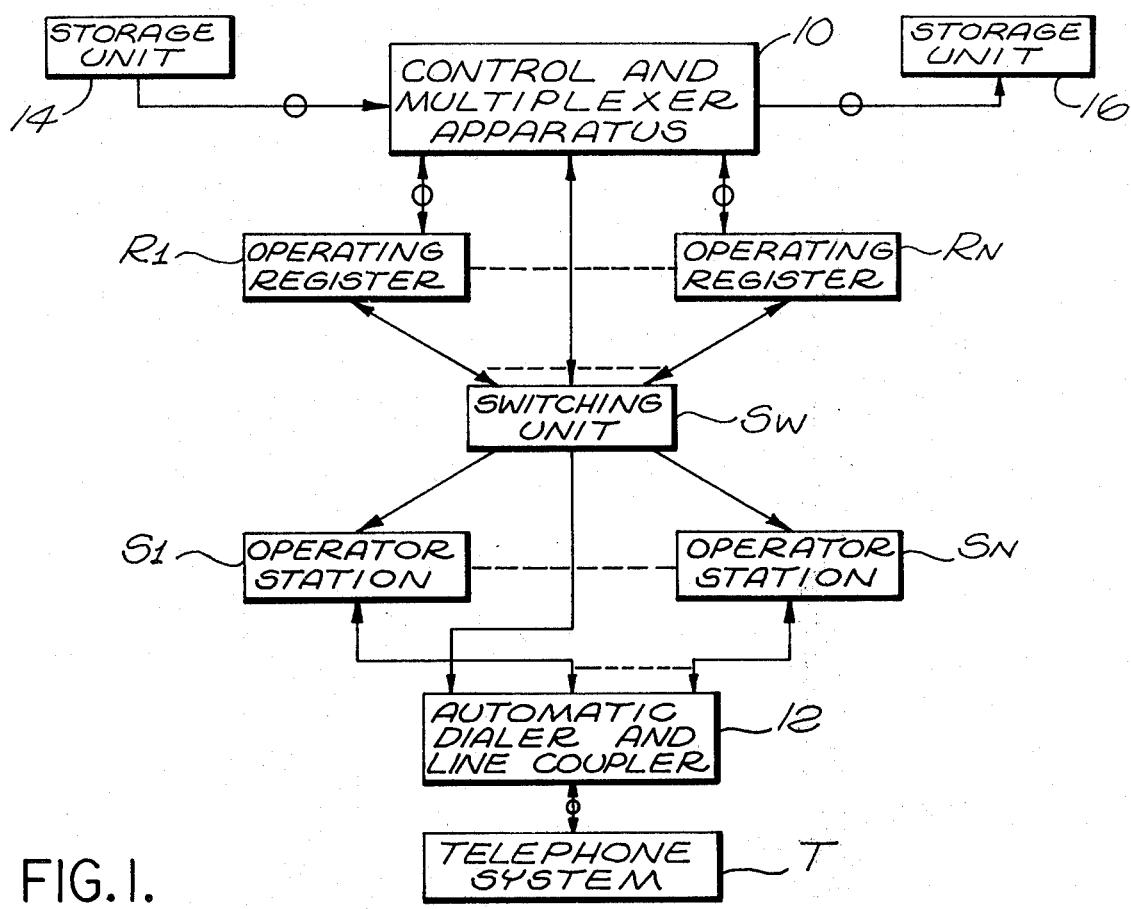
FIG. 1 is a diagrammatic representation of a system embodied in accordance with the present invention.

Referring initially to FIG. 1, a telephone system T is depicted as a block (bottom center) and is representative of a typical telephone network incorporating a multitude of instruments located at remote stations, along with facilities for conventional interconnect by dialing or other techniques. A number of "telephone lines" are provided from the system T to a cable, as indicated.

A plurality of operating registers (generally termed R) are represented in FIG. 1 (center) which are specifically designated as registers R1 through RN (only registers R1 and RN being illustrated). Each of the operating registers R may be individually coupled through a switching unit SW to one of a set of operator stations S1 through SN. The operator stations each include a telephone instrument in one form or another, for use in communication with any of a multitude of remote telephone stations represented to be within the telephone system T. Accordingly, operating registers R are coupled to provide telephone numbers to actuate the telephone system T. If a called station answers, the station (from the telephone system T) is coupled to an operator station S which is in turn coupled for communication with the operating register R carrying the called-number data. Accordingly, communication is established independently of direct human effort, after which operators are cued and may record call consequences. The system of the present invention selectively interconnects the operator stations S with a sequential series of telephone stations drawn from a list, so as to schedule and expedite telephonic contact and substantially improve the performance capability of operators active at the stations S.

As indicated in FIG. 1, the operating registers R are connected to a control-and-multiplexer apparatus 10 that is in turn connected to a switching unit SW which is connected to an automatic dialer unit 12 for actuating the telephone system T as well as for coupling operator stations S to specific lines. Essentially, after establishing a data cell in one of the registers R, the apparatus 10 controls the unit SW to actuate the dialer 12, working into a telephone system T so as to sequentially establish contact with desired remote stations for the operator stations S on demand.

The data cells, specifying the stations to be contacted along with other data, are provided from a storage unit 14 (in the form of signal-represented code words) to the apparatus 10 and after processing are transferred (modified to reflect the occurrence) to a destination storage unit 16. In addition to the storage units 14 and 16, data storage capacity also exists in the registers R and the apparatus 10.

The operator stations S each incorporate display and input facilities. The operator stations S also include a telephone instrument, which may take the form of a head set and a mounted mouthpiece (not shown). Accordingly, the operator may be provided with a visual-display structure for cuing a communication after telephone contact is established, along with input apparatus in the form of a keyboard, which may be employed to register the results of a communication. Of course, these structures may take a variety of different forms, as considered in greater detail below.

Considering an illustrative operation of the system, somewhat generally, assume for example that an operator is situated at each of the stations S with the collective objective of contacting a lengthy list of debtors in an attempt to obtain individual payment commitments. With conventional telephone equipment, the operators could be expected to spend a substantial amount of their time attempting to contact individual debtors. For example, a time allotment of 50% might be anticipated merely for efforts to establish contact with the debtors. On the contrary, in the use of an embodiment of the present system, that time allotment could be a small percentage.

Pursuing the above example for the operation of the system of FIG. 1, the storage unit 14 registers a data cell or code word for each party (debtor) desired to be contacted. Specific formats of the code word are considered below; however, in general, the data may include: the telephone number of the station where the party is expected to be contacted, identification information on the party, a status code for the contact represented by the code word, and a data space for registering the results of the call.

The code words from the storage 14 are transferred sequentially to the apparatus 10 for individual processing in one of the operating registers R. In that regard, the number of operating registers R may vary with respect to the number of operator stations S. In one embodiment, there is an excess of one operating register R. Thus, when each operator station S is busy with a called party (in association with an operating register R), the free operating register R seeks contact with a called party in anticipation of an operator concluding a contact. A premature contact may prompt a recorded message, requesting the answering party to wait an available operator. An alternative embodiment may involve a similar number of registers R and stations S. Functionally, to accommodate a time when one of the operating stations S becomes available to handle a call, depending upon implementation, a code word is transferred into an available register R to control the automatic dialer 12 (through the switching unit SW) seeking to establish telephonic communication with the station specified by a telephone number represented in the code word. In the event that the call results in either a "no answer" or a "busy" situation, the system proceeds to process another code word identifying a different party.

Upon establishing contact with a desired station, an available operator station S is operatively coupled to the proper register R (through the switching unit SW) and to the contact telephone line (through the dialer and line coupler 12). In that manner, the available operator station is coupled for communication with a remote station along with the particular operating register R containing the data cell for the remote station that has just been contacted. At one time, the operating register R1 may be associatively and functionally connected with the operator station SN and at another time the register R1 may function with the station S1.

Figure 2:
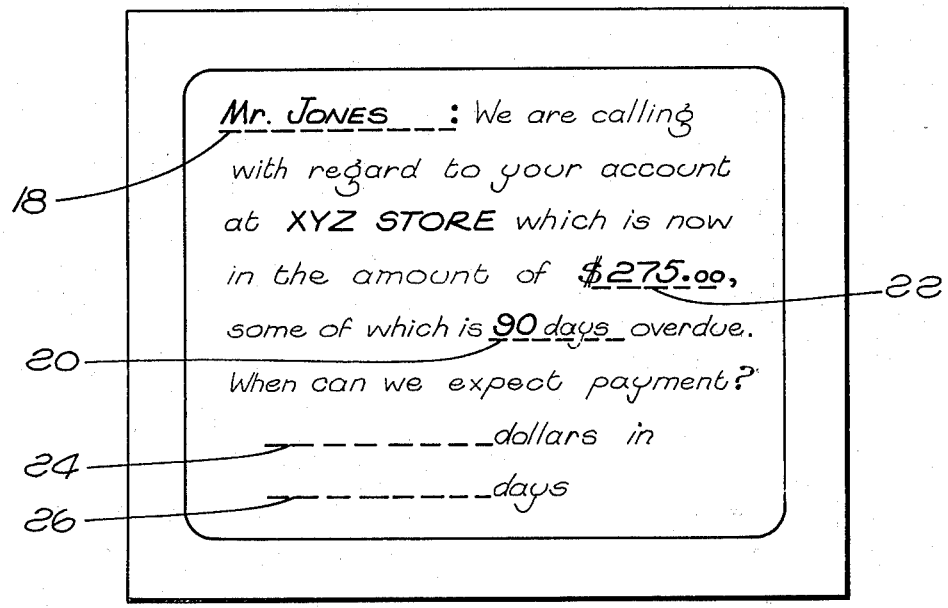
FIG. 2 is a plan view of a display unit providing a display in accordance with one mode of operating the system of FIG. 1.

Concurrently, with the establishment of telephonic contact and the functional association (coupling) of a station S and a register R, the operator at the involved station S is cued with a message to be given to the remote party. For example, assuming that the party desired to be contacted is a "Mr. Jones", the operator may be provided a display as indicated in FIG. 2. Thus, the operator is provided a physical presentation including the name of the person to be contacted along with a message incorporating fixed and variable information. Consequently, the operator can immediately enter into telephonic conversation, being completely cued for the call.

In the display as illustrated, variable information is indicated by underlines 18, 20 and 22 (not necessarily part of the display). Specifically, at line 18 the name of the party to be contacted is indicated. The amount of the debt is indicated above the line 22 and the period during which the debt has been overdue is indicated at the line 20.

Presented with an established communication channel to a remote party and a visual message cue (as illustrated in FIG. 2), the operator paraphrases or reads the cue, seeking to obtain a commitment for a payment of the amount within a specified number of days. If a commitment is obtained, the operator actuates an input apparatus at the operating station S, to register a predetermined number of dollars (indicated in the display above line 24) to be paid within a predetermined number of days (indicated above line 26).

Upon completion of a present effort, code words are transferred from the apparatus 10 to the storage unit 16, having been modified to reflect the effort to process, e.g. the experience in relation to the identified party. In addition to the specific possibilities as generally indicated above, various other data also may be obtained and registered. For example, an operator may learn that a telephone number has been changed or that contact with a party is most likely to be made at a specific time. In accordance herewith, such information may be registered in the code word for subsequent processing. That is, repeated processing efforts may be involved, with the contents (code words) of the storage 16 being returned to the storage 14 (either with or without interim processing) for another effort to seek additional contacts, thus advancing the total list toward completion.

In view of the above preliminary explanation of an embodiment of the present invention, some comments are deemed appropriate at this point. First, it now should be appreciated that the system might be operated to accommodate any of a variety of telephone control functions. That is, just as a television receiver is capable of receiving a wide variety of program information, a system in accordance with the present invention may be variously employed to implement different telephonic communications.

Fundamentally, the system involves apparatus for automatic control and telephone call sequencing. Storage apparatus is provided for registering code words (telephone numbers, status of contacts, identification of contacts, calling time and so on) along with cuing information for use by an operator. The system further incorporates control apparatus for processing calls and resulting data in an organized manner and in accordance with the demand of the individual operators manning specific operating stations. Thus, the effectiveness of the operators is considerably enhanced as by reducing the volume of tedious labor.

Figure 3A:
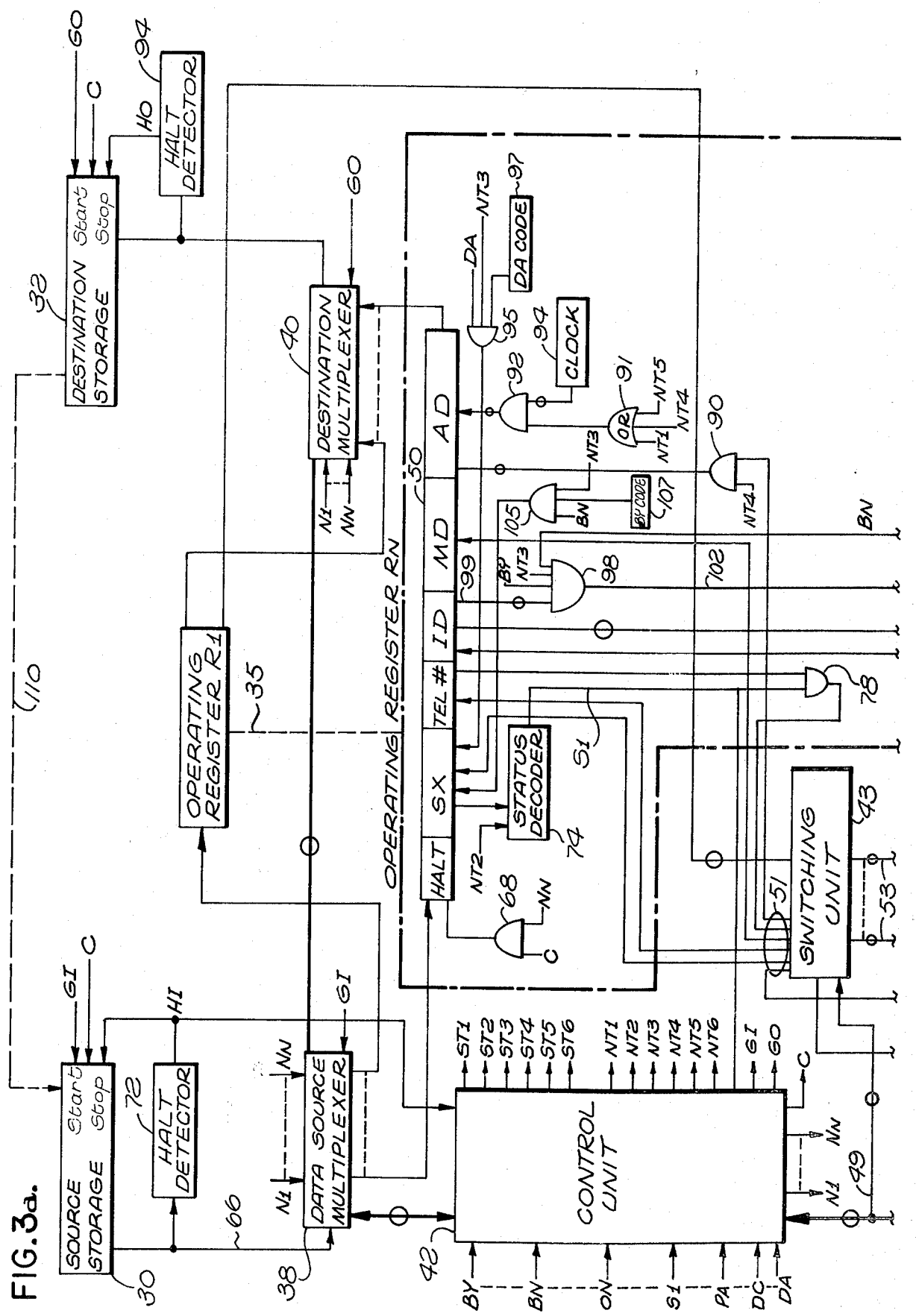
FIGS. 3a and 3b together are a block and logic diagram of a detailed system as more generally depicted in FIG. 1.
Figure 3B:
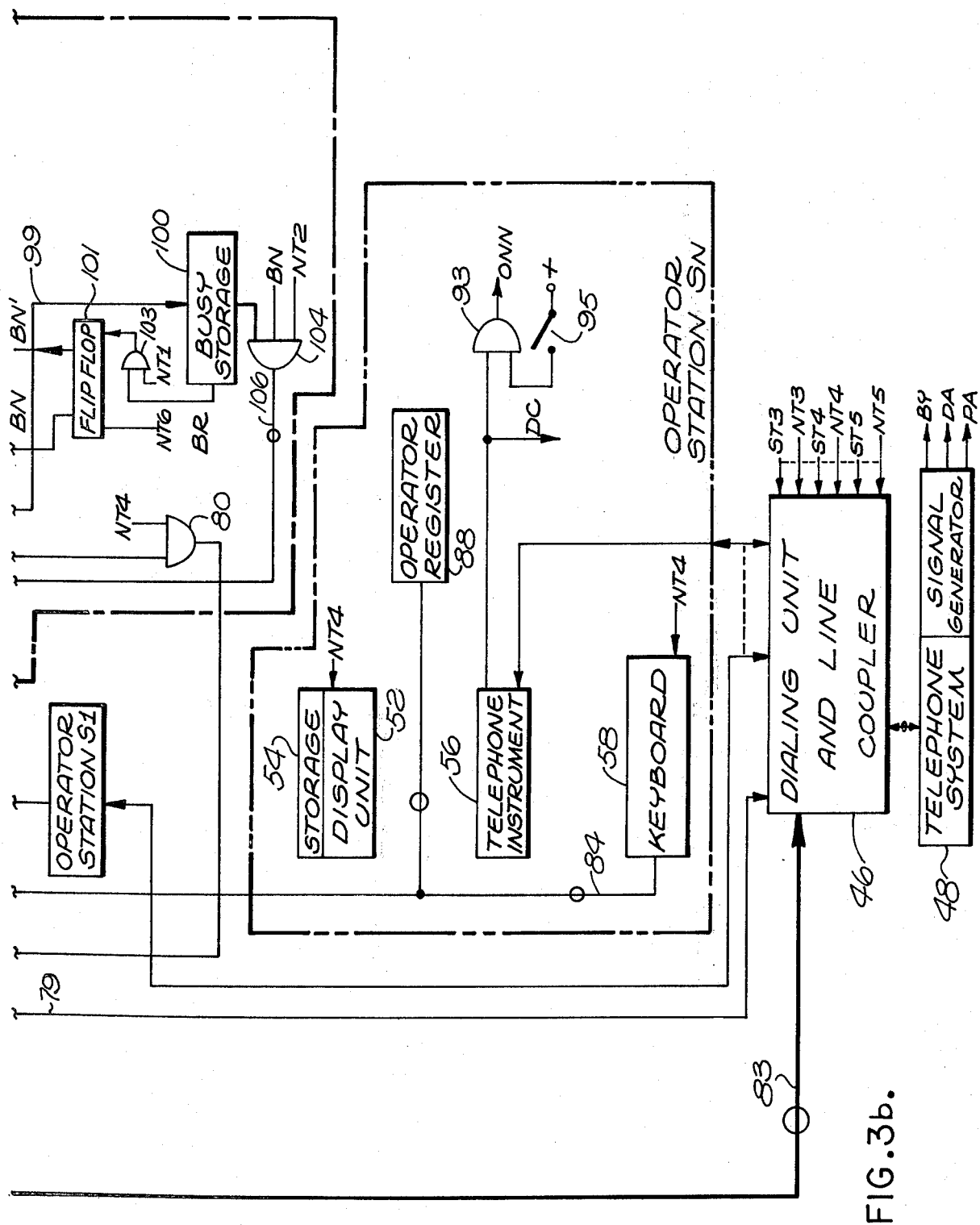

Considering the system in somewhat greater depth, reference will now be made to FIG. 3, showing the system of FIG. 1 in detail. Although certain elements are depicted in both figures, in the interests of clarity, separate identification numerals are employed. As a related comment, in FIG. 3, elements of the system are either depicted as blocks or as logic components using a standard format. As another point of information, the system involves primarily binary control signals with data represented in an alphanumeric, binary-signal format. For convenient reference, a glossary of signals specifically identified in FIG. 3 is provided below, indicating the signals by name, character and source.

| SIGNAL OR CODE | CHARACTER | SOURCE |
| --- | --- | --- |
| AD | Automatically-registered data | Code word |
| BN | Indicates busy station in storage | Flip flop 101 |
| BP | Breakpoint | Code word |
| BR | Busy station in storage | Storage 100 |
| BR1 | Code word in busy storage (R1) | Register R1 |
| BRN | Code word in busy storage (RN) | Storage 100 |
| BY | Called station busy | Telephone system 48 |
| C | Clock signal | Control unit 42 |
| DA | Called station does not answer (time lapse) | Telephone system 48 |
| DC | Call terminated | Telephone instrument 56 |
| GI | Code word moving into register R | Control unit 42 |
| GO | Code word moving out of register R | Control unit 42 |
| HI | Halt detected (code word in) | Detector 72 |
| HO | Halt detected (code word out) | Detector 94 |
| ID | Identification | Code word |
| MD | Manually-entered data | Code word |
| N1 | Code word in transfer - R1 | Control unit 42 |
| NN | Code word in transfer - RN (NT1 + NT5) | Control unit 42 |
| NT1 | State 1 RN | Control unit 42 |
| NT2 | State 2 RN | Control unit 42 |
| NT3 | State 3 RN | Control unit 42 |
| NT4 | State 4 RN | Control unit 42 |
| NT5 | State 5 RN | Control unit 42 |
| NT6 | State 6 RN | Control unit 42 |
| ON | Operator ready generic | Operating stations |
| ON1 | Operator ready station 1 | Station 1 |
| ONN | Operator ready station N | Gate 93 |
| PA | Called station answered | Telephone system 48 |
| SA | Fresh code word | Code word |
| SB | No answer (station SN) | Telephone system |
| SC | New telephone number | Keyboard 58 |
| SD | Calling time specified | Keyboard 58 |
| SE | Busy sequence occurred | Busy storage 100 |
| SF | Code word processed | Keyboard 58 |
| SG | Wrong number | Keyboard 58 |
| SH | No answer - Register RN | Keyboard 58 |
| SQ | Busy signal Register RN | Source 107 |
| SN | No answer at Register RN | Source 97 |
| S1 | Designates need to process word (see subsequent chart) | Decoder 74 |
| ST | Start transfer | Gate 62 |
| ST1 | State 1 R1 | Control unit 42 |
| ST2 | State 2 R1 | Control unit 42 |
| ST3 | State 3 R1 | Control unit 42 |
| ST4 | State 4 R1 | Control unit 42 |
| ST5 | State 5 R1 | Control unit 42 |
| ST6 | State 6 R1 | Control unit 42 |
| SX | Status of code word | Code word |
| TEL | Telephone number | Code word |

In general, the flow path of signals representing the individual data cells or code words is from a source storage 30 (upper left) to a destination storage 32 (upper right) after dwelling temporarily in the storage of one of the operating registers R1 through RN. The format for code words herein is uniform with individual elements of data being separated by break codes designated as signals BP. In the illustrative embodiment, the individual components of a code word (separated by breakpoint signals BP) are as follows:

| DESIGNATION | DATA |
| --- | --- |
| HALT | Code designated for separating data code words |
| SX | Status of code word, e.g. unprocessed, completed, etc. |
| TEL | Telephone number of station to be called |
| ID | Identification for party to be contacted |
| MD | Manually entered data, e.g. code indicating the results of a call |

| DESIGNATION | DATA |
|---|---|
| AD | Automatically entered data, e.g. code indicating the time elements of a call |

The code words are manifest in a binary, alphanumeric format. The "HALT" code is simply a unique designation which manifests the end or conclusion of a code word. The status code SX (general designation) may take any of a variety of specific forms and in that regard, the following forms with extensions are used in the system as disclosed herein.

| STATUS CODE | DEFINITION |
|---|---|
| SA | Code word is unprocessed* (fresh data cell) |
| SB | No answer in response to call attempt from operating register R1* |
| SC | Number changed as indicated on an attempt from operator station S1* |
| SD | Code word flagged to indicate a specific calling time after an attempt from operator station S1* |
| SE | Busy signal received in response to attempt from register R1* |
| SF | Communication completed at operator station S1 |
| SG | Wrong number obtained at operator station S1 |
| SH | No answer in response to call attempt from operating register R2* |
| SI | Number changed as indicated on an attempt from operator station S2* |
| SJ | Code word flagged to indicate a specific calling time after an attempt from operator station S2* |
| SK | Busy signal received in response to attempt from operating register R2* |
| SL | Communication completed at operator station S2 |
| SM | Wrong number obtained at operator station S2 |
| SN | No answer in response to call attempt from operating register RN* |
| SO | Number changed as indicated on an attempt from operator station SN* |
| SP | Code word flagged to indicate a specific calling time after an attempt from operator station SN* |
| SQ | Busy signal received in response to attempt from operating register RN* |
| SR | Communication completed at operator station SN |
| ST | Wrong number obtained at operator station SN |

*Indicates need for another attempt to establish communication with the remote party and will decode to provide a binary command signal S1 high.

As indicated, signals representing the code words or data cells are moved from the source storage 30 (FIG. 3) selectively into one of the operating registers R for processing. Of course, the number of such registers may vary in different systems. To indicate a variable number of registers R, a dashed line 35 extends between registers R1 and RN. The register RN is represented in detail and defined within dashed lines.

Movement of the signals representative of code words from the data source storage 30 is selectively directed into an available operating register R through a data source multiplexer 38. In a somewhat related manner, after processing, the signals manifesting the code words move from the operating registers R to the destination storage 32 through a destination multiplexer 40. The multiplexers 38 and 40 (along with other elements of the system) receive timing and control signals from a control unit 42 (left).

One of a set of signals N1-NN from the control unit 42 is exclusively high during each transfer interval to designate a single one of the registers R for communication through either the multiplexer 38 or the multiplexer 40 depending upon the state of operation. A simple inventory availability apparatus in the control unit 42 sequences the operation to load and unload code words appropriately into and out of the operating registers R by providing one of the signals N1-NN exclusively high to designate a specific register R. The signals N1-NN are provided high in precise coincidence with the timing signals defining loading and unloading periods for specific registers R.

The type of transfer (in or out of the operating register R) is indicated by the signals GO and GI which exclusively actuate one of the multiplexers 38 or 40. That is, for example, the high state of the signals NN and GI would command the multiplexer 38 to transfer a code word to the operating register RN. Alternatively, such a state for the signals NN and GO would set the multiplexer 40 to transfer a code word from the operating register RN to the storage 32.

Pursuing further consideration of the specific signals from the control unit 42, a set of timing signals are provided to indicate the status of each of the operating stations. These signals serve to define, among other things, the precise times for transfer. For example, the timing signals ST1, ST2, ST3, ST4, ST5 and ST6 indicate the state of the operating register R1 while a similar set of timing signals NT1, NT2, NT3, NT4, NT5 and NT6 manifest the state of the operating register RN. The provision of these timing signals along with other control signals may be variously accomplished in the control unit 42 in accordance with well-known logic implementation as disclosed in a book: "Computer Organization" by Ivan Flores, Prentice-Hall, Inc., 1969, specifically as in Chapter Two. The general logic is set out below along with functional explanations, reduced for ease of explanation to a single operating register R.

| LOGIC OPERATIONS | TIMING OPERATIONS FUNCTIONAL OPERATION |
|---|---|
| T1 = T6·ON·BN + T3·BY·BN | Load fresh code word into operating register |

| TIMING OPERATIONS | |
|---|---|
| LOGIC OPERATIONS | FUNCTIONAL OPERATION |
| T2 = T1·HI | Check status of code word |
| T3 = T2·S1 + BN'·T6 | Dial telephone |
| T4 = T3·PA | Oral communication period |
| T5 = T4·DC + T2 (delay + S1') + T3 (delay + DA) + T3·BY·BN' + T2·(SF + SL···) + T3·DA | Unload code word from operating register |
| T6 = T5·HO | Stand by for multiplexer access |

EXPLANATIONS

T1 = from T6, providing an operator is ready (or anticipated to be ready) and no "busy" code word is registered in suspense; or from T3, providing a "busy" signal occurs and no "busy" code word is registered in suspense T2 = from T1, providing code word is transferred into operating register T3 = from T2, providing code word is to be processed; or from T6, providing a "busy" code word is held in suspense T4 = from T3, providing telephonic (oral) communication is established T5 = from T4, providing telephonic (oral) communication is terminated; or from T2 if the code word is not to be processed, or from either T2 or T3, providing an undue delay interval; or from T3, providing a "busy" signal results when a code word is already in the suspense (busy) register; or from T2, providing the code word has been processed T6 = from T5, providing the code word is returned to storage It is to be noted that in the above logic equations, the signals are indicated generically by dropping the station designation, e.g. T1 is generic for signals ST1 through NT1 (state one, each station). Other signals indicated in the logic are: ON, BN, BY, HI, S1, PA, DC and HO. Although described in detail below, introductory comments will now be made on such signals. Signal ON indicates that the attending operator and the operating station are ready to receive a contact. The signal BN manifests that a code word which produced a "busy" signal from the telephone system is being held in suspense for immediate attention after the code word in process. The signals BY and PA respectively indicate a "busy" signal and an "answered" call condition while DA indicates no answer from called station. A halt code (HALT) is indicated to have been detected (manifesting the end of a code word) by the binary signals HI and HO. A word having a status code which indicates the need for further processing effort is decoded to produce the signal S1 high. Finally, the signal DC indicates a call has been terminated.

A clock signal C is also provided from the control unit 42 as very well known in the prior digital processing art, for sequencing the operation of the system. As indicated above, the signals N1 through NN (one signal for each register R) are provided to designate a time when each of the operating registers R is currently in the process of either receiving or providing a code word. As a consequence, these signals are high during the intervals of transfer, i.e. T1 and T5. The input signals to the control unit are indicated, reflecting the above logic expressions. Although represented signals are from operating register RN and station SN, similar signals from other such stations would also be applied, as designated by dashed lines in the figure.

Returning now to further consideration of the operating registers R, each is connected through a switching unit 43 (center FIG. 3a) to an automatic dialing unit and line coupler 46, which is in turn connected to a telephone system 48. The switching unit 43 is controlled by the control unit 42 through a cable 49 to time share the automatic dialing unit 46 among the registers R and to selectively couple the registers R to the operating stations S for associated operation. The operating stations S are selectively coupled to telephone lines (represented by the system 48) for oral communication through the coupler 46.

The telephone system 48 as represented herein further includes a binary signal generator for manifesting the three signals indicative of calling responses. Essentially, the structure simply senses the conditions of: "busy", "don't answer", and "answered", to provide respectively the binary signals BY, DA and PA as described above.

Turning now to the detailed structure of the representative operating register RN, individual code words are received in a code-word register 50. From that location, the code words actuate control functions and are modified in accordance with the results of placing a telephone call. That is, initially the operating register RN operates directly with the telephone system (through the switching unit 43). During that period, a number is dialed, seeking contact with the desired party. If no contact occurs, e.g. "busy", or "no answer", the system records the fact, in the code word, and proceeds to pursue processing another code word. However, if contact occurs (T4), then the register R is functionally coupled to an available operating station S and the code word is subsequently modified to reflect the consequences of the contact. Such modification involves input action by the operator at the operating station S.

As indicated above, each operating station S incorporates display facilities for manifesting a cue. Specifically in the station SN, a display unit 52 is provided which incorporates a storage section 54. Of course, the storage section 54 may be common rather than station associated. Also, the station SN is equipped with a telephone instrument 56 (lower left) which as indicated above may comprise a head set with an attached microphone or mouthpiece. The operating station SN also incorporates a keyboard 58 (lower left) which is employed to register data (perceived by the operator) in code words. That is, during a conversation, the operator may formulate a status code to modify the code word so as to indicate the results of a contact. For example, the operator may register completion of the desired inquiry.

In view of the above preliminary description of the system represented in FIG. 3, a complete understanding may now best be accomplished by considering specific operating cycles. Accordingly, assume that the operator station SN is attended and ready to become operational. Furthermore, assume that the source storage 30 contains a multiplicity of data words identifying parties who are to be contacted, for example, in relation to a debtor's account as explained above. Finally, assume that the operating register RN is available (free) and is next in the operating sequence to establish communication, as for an operator located at an operating station S. The operation may proceed from such a point with the control unit 42 providing a high state for the signals: NN, GI, and NT1. Recapitulating, the signal GI designates an interval of transferring data into an operating register R; the signal NT1 indicates an interval of loading a code word into the register RN and the signal NN is coincident and commands the multiplexer for such a transfer. The application of the starting signal GI to the source storage 30, provides a code word through a channel 66 and the multiplexer 38 (directed by signal NN) to the register 50 in operating register RN.

In the structural form of the system as described herein, signals representative of the code word are simply stepped into the register 50 element-by-element under the control of clock signals C which are applied to the register 50 through an "AND" gate 68 (upper left). In that regard, the "AND" gate 68 is qualified by the signal NN, designating register RN to be in a transfer state. Thus, a code word is moved from the source storage 30 into the register 50.

The end of a code word is sensed when a halt detector 72 (upper left below storage 30) senses the HALT code. The detector 72 may take any of a variety of forms of binary-code detectors and functions to provide the high state of the binary signal HI, upon sensing the HALT code, to manifest the end of the code word. The signal HI is applied directly to stop the output operation of the source storage 30 pending another cycle of operation. The signal HI is also supplied to the control unit 42 to terminate the timing interval indicated by the signals NT1 and NN, as well as to initiate the interval of the timing signal NT2 in accordance with the logic as set out above.

During the interval of timing signal NT2, the status of the inquiry represented by the registered code word is considered. Exemplary of the status data which may be represented by a code word now contained in the register 50 is the following:

| | |
|---|---|
| HALT | Code |
| SX | Manifests that the code word is fresh (unprocessed) |
| TEL | 6271292 |
| ID | John Jones, Los Angeles |
| MD | (blank) |
| AD | (blank) |

With reference to the portions of the code word designated as MD and AD, a fresh or unprocessed code word normally would carry no data relating to prior efforts at processing. Such data is indicative of experiences during prior efforts to process and is useful in processing the contents of the destination storage 32 to analyze or study: performance of operators, results of processing and status of processing. During efforts to process a code word, if a party is contacted, the section MD will receive an input from the operator to designate any of a variety of call results, e.g. payment promised on a certain date, telephone number changed, or so on. Conversely, the section of the code word designated as AD automatically receives data (independently of an operator while the code word is in an operating register R), e.g. the time of contact and the time of termination. The actual registration of information in both the sections MD and AD is explained in detail below.

Recapitulating, at the presently-described stage of operation, a code word indicative of a particular party or subject to be contacted is contained in the register 50. Additionally, the control unit 42 has just provided the timing signal NT2 in a high state. As a consequence, a status decoder 74 (left, below register 50) is actuated to sense the status portion SX of the code word to provide a representative binary signal S1. That is, assuming the code word is fresh (or if otherwise in need of processing), the decoder 74 indicates a high value for a signal S1 (S1 = SA + SB + SC + SD + SH + SI + SJ + SK + SL - - - ) which is applied to the control unit 42 as well as to a gang (parallel transfer) gate 78. The qualification of the "AND" gate 78 by the signal S1 results in the transfer of the telephone number signals (TEL) through that gate 78 and the switching unit 43 to the dialing unit 46 through a cable 79. Somewhat concurrently, the timing sequencer in the control unit 42 is advanced to provide the signal NT3 in a high state, such occurring with the coincidence of the signals NT2 and S1 as indicated in the above logic expressions.

Subsequently, the automatic dialing unit 46 is actuated as a result of the occurrence of the third-phase timing signal (T3) from the control unit 42, e.g. NT3. In the disclosed embodiment, the unit 46 (with a single dialer) is shared among the operating registers R. In the assumed example, during the period indicated by the signal NT3, the number: 6271292 is dialed by the dialing unit 46, providing appropriate input signals to the telephone system 48.

Upon completion of the dialing operation, any of a number of events may occur. For example, a "busy" signal BY may be indicated from the telephone system 48 or the remote station dialed may or may not be answered, resulting in the signal DA. Only when the remote station is "answered" (producing the signal PA high) is the operating register RN coupled to the operator station SN. Thus, the operating registers R receive data cells or code words and process such words to the point of contacting a person at a remote station before becoming functionally coupled to an available operator station S. Summarizing, code words are transferred to individual operating registers R from which telephone numbers are provided in time-shared sequence to the dialing unit 46. Only when the remote station dialed is answered, is the operating register R functionally coupled to an available operator station S (through the switching unit 43) and the operating station S to the telephone system 48 (through the coupler 46).

Structurally, the switching unit 43 is simply a signal-controlled switching apparatus as well known in the art. Control signals are provided from the primary control unit 42 through the cable 49. The unit 43 multiplexes the operating registers R which are in the state designated T3 for time-shared access to the telephone dialing unit 46. Thus, one aspect of the switching unit 43 is structurally simply that of a multiplexer. The other function of the unit 43 is to intercouple individual operating registers R to individual operator stations S which are in turn connected to the telephone system 48. Specifically, under the control of the primary control unit 42, the switching unit 43 interconnects a series of inputs, collectively designated as cables 51 and 53 to a select one of the operating stations S, when the remote station sought for an operating register R is contacted and an operating station S is available. Thus, connection is established from a specific operating register R to a specific operator station S through: one of the cables 51, the unit 43 and one of a series of cables 53.

Such a connection, along with the connection of the operating station S to the telephone system 48 endures only for the period of the timing signal T4 for the specific operating register R involved in the connection.

Summarizing the operation to some degree, the unit 43 time shares the automatic dialing unit 46 among the operating registers R that are in the state designated by the signal T3. Furthermore, the same switching unit 43 functionally couples operating registers R to operator stations S during the intervals that such registers R are designated by the timing signal and concurrently connection is established between the operator station S that is involved and the telephone system 48, as disclosed in detail below.

In one embodiment of the present system, the multiplexing of the operating registers R to the dialing unit 46 is further qualified in relation to the availability of certain telephone lines. That is, in the disclosed embodiment, the application involves telephone numbers specifying stations that are compatible to all the telephone lines represented to the automatic dialing unit 46 by the telephone system 48. However, it is envisioned that with the exercise of ordinary skill in the art, in view hereof, line selectivity could be provided on the basis of telephone numbers. That is, the multiplexing operation of the switching unit 43 would relate specific telephone numbers to specific telephone lines and access the registers R accordingly. Of course such accessing could also be related to selectively couple certain operator stations S to specific of the operating registers R on the basis of telephone numbers or other criteria.

Returning to the system of the disclosed embodiment, as indicated above, with the occurrence of the timing signal T4, indicating a remote station has been answered, an available operator station is coupled to the operating register R and the telephone system 48, by the switching unit 43. Also, upon the occurrence of the signal PA (remote telephone station "answered") during the timing signal NT3, the available operator station S is coupled to the contact telephone line, through coupler 46, and the control unit 42 advances the operating sequence to NT4, i.e. the signal NT4 becomes high.

Considering the connections somewhat more specifically, cable 51 from the operating register RN is connected through the switching unit 43 and one of the cables 53 to the free operator station SN. Concurrently, the free station SN is connected through the line coupler 46 to the telephone system. In that regard, the coupler 46 is simply controlled by a signal received from the control unit 42 through a cable 83, to couple the line that has been "answered" to a free operating station, specifically SN for example, at the instant of timing signal T4. The coupling is broken at the time of the signal T5 when the conversation is terminated.

To accomplish the cuing display for an operator simultaneously with the line coupling, the signal NT4 is applied to an "AND" gate 80 which passes signals representing a selected portion of the identification data ID through the switching unit 43 for display by the display unit 52. Of course, the specific display employed may be varied in accordance with a desired format. However, as disclosed herein, the identification information is presented in an integrated cuing message along with fixed information provided from the storage 54. Specifically, as illustrated in FIG. 2, the operator sees a complete cue with the identification information from the register 50 providing the name of the party to be contacted and details of the dept which forms the subject of inquiry. Thus, when the system enters the period manifest by the high state of the signal NT4, the operator is provided complete cue information with which to proceed.

Continuing with the assumed example, during the initial portion of the interval manifest by the signal NT4, the operator reads (or paraphrases) the message or cue provided by the display unit 52 (FIG. 2). Thus, the operator seeks to obtain a commitment for the payment of a specified amount of money prior to a specified time. In that regard, assume for example, that during the conversation the operator is given a commitment by the called party, for the payment of $100.00 within 10 days. In such a situation, the operator employs the keyboard 58 to provide a code signal indicative of that commitment for registration in the signal portion MD (manual data) of the register 50. Of course, various formats may be employed to encode different commitments or agreements; however, an exemplary format is indicated by the alphabetic pattern as follows:

| CODE | REPRESENTATION |
|---|---|
| A | $10.00 within ten days |
| B | $20.00 within ten days |
| C | $30.00 within ten days |
| D | $40.00 within ten days |
| — | — |
| — | — |

In accordance with an extension of the above exemplary format in the described situation, the operator would actuate the keyboard 58 to indicate the commitment as code J and also would revise the status of the code word to SR (processed at station SN). Thus, the code word would carry an indication that is was processed at the station SN and that the party had committed to make a payment of $100.00 within a period of 10 days.

It is noteworthy that the keyboard 58 is operatively controlled for use by the signal NT4 to enable an input to the code word. In that regard, the operator may provide other code indications, as considered above, including a subsequent time to contact the party or a different telephone number for the contact. In the latter event, the keyboard 58 is actuated to place a fresh telephone number in the register 50, section TEL. Specifically, a cable 53, coupling the keyboard 58 to the register 50 through the unit 43, carries signals which establish a fresh telephone number in the appropriate section (TEL) of the register 50.

Additionally, the station operator may actuate the keyboard to provide other status codes, e.g. signal SO, "number changed". In an alternate form, the system may be embodied to pursue the fresh number immediately by the addition of structure somewhat as described below in association with the processing of a "busy" number. However, as described herein (for simplication), the code word containing a fresh number is simply returned to the destination storage 32 for subsequent processing during a later cycle into an operating register R.

In addition to the data provided to the register 50 from the keyboard 58 (under manual control), the system also automatically records certain significant data. Specifically, the identification of the operator is contained in a register 88 (operator station SN) which is connected through the cable 53, the switching unit 43 and a gang "AND" gate 90 to the portion AD of the register 50. The "AND" gate 90 is qualified by the signal NT4 to pass signals identifying the operator to the register 50.

Certain reference times relating to contact are also registered, some of which occur prior to contact. Specifically, the portion AD of the code word (in the register 50) provides space for three distinct real-time entries when a word is processed. The time of attempted contact (NT1) is registered, the time of established contact (NT4) is registered, and the time of terminating an established contact (NT5) is registered. The signals (NT1, NT4 and NT5) indicative of these times are applied to an "OR" gate 91 which qualifies an "AND" gate 92 connected between the portion AD of the register 50 and a real-time clock 94 which provides digital representations of the real time, as in a Julian format. The time signals are thus stored.

At the conclusion of a telephonic contact, significant information has been registered (manually and automatically) in the code word. As in the above example, the code word may have been completely processed, as with a payment commitment. Alternatively, the word may represent a contact yet to be established, as considered in detail below. In any event, after the effort to process, the code word is transferred to the destination storage 32 upon initiation of the signal NT5.

In concluding a telephonic contact, the operator actuates the telephone instrument 56 to provide a disconnect signal DC which is applied to the control unit 42, and to an "AND" gate 93. The control unit 42 then advances the indicated state for the operating register RN from that of the signal NT4 to NT5. The "AND" gate 93 receives another input from a switch 95. So long as the operating station SN is attended, the switch 95 is closed. Accordingly, with the switch 95 closed and the telephone instrument disconnected, the "AND" gate 93 is qualified and provides the signal ON high to indicate readiness for another contact, the switching unit 43 isolating the station.

Upon the occurrence of the signal NT5 for the operating register RN, the control unit 42 provides the signal GO (high state) and the high state of the signal NN. These signals command the transfer of the code-word signals from the register 50 through the destination multiplexer 40 to the destination storage 32. In the single-multiplexer embodiment, as the multiplexer 40 is common to all of the operating registers R, the signals T5 are exclusively high among the operating registers which may involve some delay in the existence of the signal NN to command transfer of the code word to the destination storage 32.

Movement of the code-word signals from the register 50 again is accomplished in a stepping fashion by the clock pulses C which again are applied through the "AND" gate 68. In that regard as indicated above, the gate 68 is qualified during the transfer period by the signal NN. At the end of the transfer, as the HALT code moves from the register 50 through the multiplexer 40, that code is sensed by a HALT detector 94 to provide the high state of a binary signal HO. At such time, the transfer to the storage 32 terminates and the control unit provides the signal NT6 in a high state. That signal commands the "stand-by" configuration during which an operating station SN awaits the time-shared operation of the multiplexer 38 to receive the next code word.

Thus, individual code words are drawn from the source storage 30, distributed selectively to operating registers R1 through RN to specify a remote station to which contact is desired for communication with a specific party. The code words carry the signals to control automatic dialing equipment in an effort to establish communication. As indicated above, in the event that contact is made, the operator is connected for communication and cued with pertinent information from which a response is solicited. The response may then be registered as a portion of the code word completing the desired communication. Therefore, it will be apparent that the operators are released from the burdensome and time-comsuming work of seeking to establish contact and additionally, the effectiveness of the operator is substantially improved by the cuing displays. The utilization of state-of-the-art operating components in the system enables very high-speed operation with the result that several code words may be tested with little or no concern for time loss by individual operators. Of course, as will be readily apparent to one skilled in the art, various numbers of automatic dialers and various forms of multiplexing equipment may be employed to accommodate a desired number of operators at individual operating stations.

The above explanation of an operating sequence proceeded on the assumption that telephonic communication was established with a party. However, as indicated, other possibilities may exist, i.e. the remote telephone station may not be answered or may be busy. In the event that the call is unanswered, the system proceeds on the premise that another attempt should be made at a considerably later time. However, the event is recorded in the code word by the qualification of an "AND" gate 95 (right, below register 50). That is, upon the occurrence of the signal DA (indicating no answer) during the interval NT3, the gate 95 passes an appropriate code, i.e. code SN (chart above) from the code source 97 to be registered in the SX section of the code word in the register 50. Concurrently, the state for the operating register RN changes from that of signal NT3 to that of signal NT5. As a result, the system proceeds to unload the code word signals from the register 50 to the destination storage 32 as explained above. The word thus being held for another subsequent effort to process.

The manifestation of a busy remote station, on the other hand, suggests that the telephone is being attended with the result that one more effort should be made within a relatively short period, e.g. a few minutes. Accordingly, the system places the instant code word in a temporary storage location, proceeds to process another code word from the source storage 30, then subsequently retrieves the code word which prompted a busy signal and repeats the effort to establish communication.

It will be apparent to one skilled in the art that various embodiments hereof may utilize different types of storage to accommodate a series of "busy" responses and to circulate signals representative of code words for repeated dialing operations as to some preselected number of attempts. However, as disclosed herein, the illustrative embodiment simply registers the code-word signals with an indication of a busy, proceeds with another code word, then returns for one more attempt with the code word carrying a number indicated to be busy. Failing contact at that time, the code word is flagged and the representative signals are returned to the destination register 32.

It is during the interval which is represented by the signal NT3 (after dialing) that the "busy" tone may result to produce the signal BY from the telephone system 48. Upon such an occurrence (providing no prior busy code is registered), a gang "AND" gate 98 (center, below register 50) is qualified to transfer the entire contents (code word) from the register 50 to a busy-signal storage 100. The "AND" gate 98 is connected between cables 99 and 102 to accomplish a parallel transfer to a busy-signal storage 100.

With the registration of the "busy" code-word in the storage 100, the signals BY and NT3 actuate the control unit 42 to provide the signal NT1 in a high state, as indicated in the above logic expressions. As a result, the signals BR and NT1 qualify an "AND" gate 103 to reset the flip flop 101 providing the signal BN' high until the flip flop 101 is set by the signal NT6.

During the period of the signal BN', a fresh code word is transferred to the register 50 for processing, then returned to storage (even if a busy signal occurs) in the destination storage 32. However, note that the code word involved in such a circumstance is flagged as a result of a gate 105 (under register 50) being qualified (coincident of signals BN' and NT3) to register the event in the code section SX. SL; . . . )

The signals from the storage 100, representing the previously "busy" code word are returned to the register 50 (gate 104 — signals BN and NT2) for another attempt at processing. Processing of the code word then proceeds as described above. If another busy signal is produced, with the signal BN high (flip flop 101 set), the control unit 42 commands transfer to storage 32 of the code word by providing the state indicated by NT5, again as specified in the logic expressions. Coincidentally, the busy experience is registered by qualification of an "AND" gate 105 by signals NT3 and BN' to pass the busy code SQ from a code signal source 107 to the status code section of the register SX. It is noteworthy that the same treatment occurs for code words that produce a busy signal BY at a time when a code word is being held for another attempt in the register 100.

After the transfer of all code words from the source storage 30 to the destination storage 32, some return may be made to the source storage 30 as indicated by a dashed line 110. For example, in the event that the code words are registered on a magnetic disc, the destination storage 32 may simply become the source storage 32. In such an event, as code words are moved into storage registers as the register 50, those code words which are indicated to have been processed by appropriate status code (SF, SL, . . . ) are simply immediately transferred to the destination storage 32. That is, as indicated in the above logic equations, the occurrence of a processed status code, during the timing interval T2, immediately returns the system to a T5 configuration.

As an alternative to a direct transfer from the destination storage 32 to the source storage 30, some processing may be performed. In that regard, it may be advisable to eliminate processed code words, or to schedule code words for processing at specific times in accordance with an indicated time of availability for a party. Such operations may be performed in accordance with well-known data processing techniques and accordingly are not described in further detail herein.

In view of the above description, it may be seen that the system may be effectively used to schedule telephone contacts for various numbers of operators. Of course, the system may be variously implemented and variously used depending upon specific applications. Accordingly, the scope hereof shall not be referenced to the disclosed embodiment, but on the contrary, shall be determined in accordance with the claims as set forth below.

What is claimed is:

1. A telephone scheduling system for use in cooperation with a telephone network, comprising:
   storage means for storing a plurality of data cells including data on individual telephone numbers identifying stations to be contacted along with representations of message information;
   at least one operating station including a telephone instrument, cue manifesting means, register means for receiving signals from said storage means representative of said data cells, and means for supplying data cell signals representative of message information from said register means to said cue manifesting means;
   an automatic dialing means coupled to said telephone network and connected to receive data cell signals representative of telephone numbers from said operating station register means, for dialing said stations to be contacted;
   sensing means coupled to said telephone network for providing an answer signal to indicate contact with one of said stations to be contacted and an interrupt signal to indicate termination of telephonic contact; and
   sequence control means for sequentially providing signals representative of said data cells from said storage means to said operating station register means, returning said data cells to said storage means, and actuating said automatic dialing means, said telephonic instrument, and said cue manifesting means, under control of said sensing means.

2. A telephone scheduling system in accordance with claim 1 further including automatic input means for registering data in said register means of said operating station indicative of results from said sensing means.

3. A telephone scheduling system in accordance with claim 1 further including manual input means for registering data in said register means of said operating station indicative of data communicated to an operator at said operating station.

4. A telephone scheduling system in accordance with claim 1 including a plurality of said operating stations and further including telephone multiplexer means for selectively coupling said operating stations to said automatic dialing means and said telephone network under control of said sequence control means.

5. A telephone scheduling system according to claim 4 further including automatic input means for registering data in said register means indicative of results from actuating said automatic dialing unit.

6. A telephone scheduling system according to claim 4 further including manual input means for registering data in said register means indicative of data communicated to an operator at said operating station.

7. A telephone scheduling system according to claim 4 further including input means for altering said data cells in said operating stations to indicate call results.

8. A telephone system according to claim 7 including means to alter said data cells to indicate times of calls.

* * * * *

UNITED STATES PATENT AND TRADEMARK OFFICE
CERTIFICATE OF CORRECTION

PATENT NO. : 3,989,899
DATED : November 2, 1976
INVENTOR(S) : Daniel Norwich

It is certified that error appears in the above-identified patent and that said Letters Patent are hereby corrected as shown below:

| Column | Line | |
|---|---|---|
| 14 | 1 | "dept" should be --debt--; |
| 14 | 49 | after "TEL", --#-- should be inserted; and |
| 17 | 29 | after "SX.", "SL;...)" should be deleted. |

Signed and Sealed this

Fifteenth Day of March 1977

[SEAL]

Attest:

RUTH C. MASON
Attesting Officer

C. MARSHALL DANN
Commissioner of Patents and Trademarks

REEXAMINATION CERTIFICATE (796th)

United States Patent [19]
Norwich

[11] B1 3,989,899

[45] Certificate Issued   Dec. 15, 1987

[54] TELEPHONE SCHEDULING SYSTEM

[75] Inventor: Daniel Norwich, Beverly Hills, Calif.

[73] Assignee: Telecredit Inc., Los Angeles, Calif.

Reexamination Request:
No. 90/001,163, Feb. 4, 1987

Reexamination Certificate for:
Patent No.: 3,989,899
Issued: Nov. 2, 1976
Appl. No.: 566,643
Filed: Apr. 8, 1975

Certificate of Correction issued Mar. 15, 1977.

[51] Int. Cl.$^4$ .................... H04M 11/00; H04M 1/26
[52] U.S. Cl. .................................... 379/134; 379/92;
379/355; 379/201
[58] Field of Search .......... 379/355, 134, 92, 265–267,
379/309, 356, 357, 359

[56] References Cited

U.S. PATENT DOCUMENTS

| | | | |
|---|---|---|---|
| 3,407,269 | 10/1968 | Brzoska | 379/40 |
| 3,445,601 | 5/1969 | Whitely et al. | 379/69 |
| 3,692,938 | 9/1972 | Addeo | 379/54 |
| 3,728,486 | 4/1973 | Kraus | 379/69 |
| 3,733,440 | 5/1973 | Sipes | 379/70 |
| 3,806,649 | 4/1974 | Jinguji et al. | 379/94 |
| 3,899,645 | 8/1975 | Brafman | 379/355 |
| 3,920,908 | 11/1975 | Kraus | 379/91 |
| 3,922,492 | 11/1975 | Lumsden | 379/98 |

*Primary Examiner*—James L. Dwyer

[57] ABSTRACT

A system is disclosed for use in cooperation with a telephone network to schedule and control telephonic contacts, as from a plurality of calling stations to a number of parties at individual remote stations. Storage means are provided for registering code words (associated with stations that are to be called) along with representations of message information to be conveyed. For example, code words may store representations of: a number for a station to be called, the name of a party to be contacted at the station, a status code and so on.

In the operation of the system, a control unit actuates an automatic dialing unit with a number from storage. Subsequently, the system senses the possible results of dialing a number, i.e. as a busy signal, no answer or a station contact. In the event of a busy signal or no answer, a code word (from storage) may be appropriately modified then stored for use in a subsequent attempt. Upon the occurrence of a contact, connection is made to an operator station and a display unit is actuated to cue the operator with the desired message. The system also incorporates input means for use by the operator to enter information in the code word indicating the results of a call.

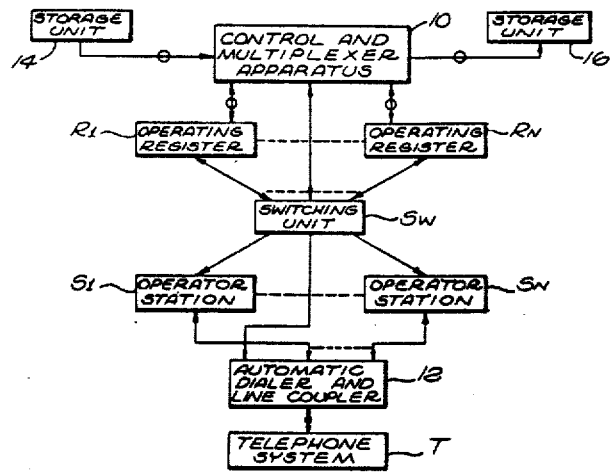

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-8 is confirmed.

* * * * *